April 30, 1957
R. BECKADOLPH ET AL
APPARATUS AND METHOD FOR PLACING BEAD
CORES ON TIRE BUILDING DRUMS
Filed June 10, 1954
2,790,481
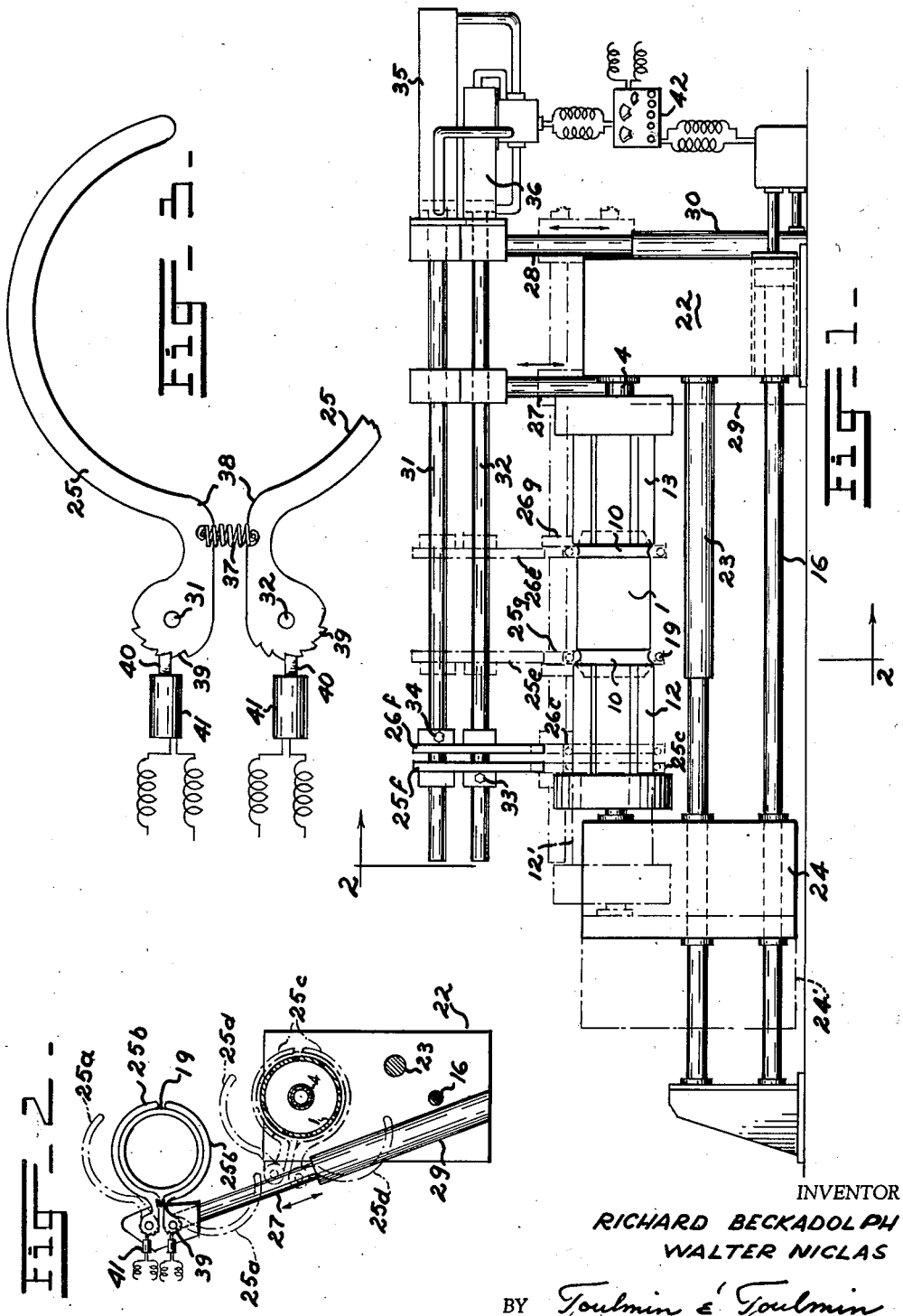
INVENTOR
RICHARD BECKADOLPH
WALTER NICLAS
BY *Toulmin & Toulmin*
ATTORNEYS United States Patent Office 2,790,481
Patented Apr. 30, 1957

2,790,481

APPARATUS AND METHOD FOR PLACING BEAD CORES ON TIRE BUILDING DRUMS

Richard Beckadolph and Walter Niclas, Hannover, Germany, assignors to Firma Continental Gummi-Werke, A. G., Hannover, Germany Application June 10, 1954, Serial No. 435,671

Claims priority, application Germany June 10, 1953

14 Claims. (Cl. 154—9)

This invention relates to an apparatus for placing and positioning bead cores to be used with machines for manufacturing pneumatic tires built from a flat ribbon or band of tire fabric, wherein these machines possess a tire buiding drum of variable diameter.

The apparatus according to the invention is particularly suitable for use with a tire building machine as described in our U. S. patent application 350,544, filed on March 5, 1953 now U. S. Patent No. 2,743,760.

During operation of the known machines for building pneumatic tires the bead cores are placed onto the bead placing rings by the person attending the machine prior to the actual building of the tire casing. During this step of the process the machine is idling and full exploitation of its production capacity is thus prevented.

It is an object of this invention to provide an apparatus which makes it possible for placing the bead cores on the core holders or core placing rings while the machine is in operation, i. e. during the actual tire building process.

It is a further object of this invention to avoid losses of production capacity in tire building machines by effecting the placing of bead cores for use in building a tire casing in the core holders or core placing rings during the building of a previous tire casing on the building drum.

The objects referred to above and still other objects and advantages of this invention are attained by utilizing tong-like gripping means which consist of pairs of jaws so devised as to receive the bead cores therebetween. These gripping means are movable in parallel as well as perpendicular direction to the axis of the tire building drum. It is thus possible to move the aforesaid gripping means serving as bead core holders in such a way that bead cores may be placed on them when the gripper jaws are open and firmly held by closing the gripper jaws, before the gripping means are moved into the operational range of the tire buiding drum.

The grippers and the bead cores held by them are then guided into coaxial position with the tire building drum as soon as the previously built tire casing has been withdrawn from the drum. After the fortifying inner layers have been brought onto the tire building drum, the grippers are then displaced axially, i. e. parallel to the drum axis, until the bead cores have reached their determined position around the drum. Thereupon the tire building drum is inflated, i. e. the diameter of the same is increased, and it will automatically open the gripper jaws by pressing against a curved part of the inner surface of the latter, and the grippers may then be withdrawn from the drum and returned by hand or by automatically controlled steering means to their initial position. At a given moment during this return movement or at the end of the same, the bead cores destined for the following tire casing are introduced into the gripping means, preferably by hand, which bead cores are seized by the gripping means upon closing the gripper jaws either by hand or through further automatic steering means also synchronized with the other operational steps of the tire building machine.

The gripping means are made displaceable in the direction of the drum axis and vertically thereto in a simple manner, for instance by slidingly supporting them on guide means, such as rods or the like, arranged parallel to the drum axis, or rigidly fastening them to the guide means and reciprocating the latter. Normally there will be two pairs of grippers provided in a tire building machine, and one guide rod is preferably arranged to bear the top jaws of both grippers, while a second guide rod is provided for supporting the lower gripper jaws. It is, however, also possible to support all the jaws for the necessary two grippers on one single guide rod. These guide means are devised in a suitable manner for the gripper jaws to carry out a pivotal movement so that the jaws may be moved apart, and the gripping means opened to release the bead cores. The movement of the gripping means in a direction vertical to the drum axis can be achieved by rotatably supporting the grippers on the guide means so that the latter may either be brought into engaging position with the tire building drum or may be moved away into a position clear of and outside the operational range of the drum.

A rotary movement of the gripping means to this end becomes unnecessary, if the guide means themselves are displaceable vertically in relation to the drum axis. The necessary displacement can be achieved by pneumatic, hydraulic or purely mechanical devices such as a rack or the like. Furthermore control means may be provided for automatically opening and closing the grippers by a corresponding pivotal movement of the upper and lower gripper jaws.

These means are made superfluous if the gripper jaws are resiliently pivoted around their respective guide rods and if they can be locked when reaching a certain open position, so that they remain in this position and will only close under the urge of resilient means such as a spring or the like, after the locking device or catch has been released. This locking device or catch becomes operative after the gripper jaws have been moved apart up to a certain position by the presure of the radially expanding tire buiding drum upon certain curved parts of the inner surface of the gripper jaws.

The release of the catch may either be achieved manually by the attendant who is inserting the bead cores in the open gripping means or automatically by control means equally synchronized with the successive movements of the gripping means parallel with and vertical to the axis of the tire building drum.

The gripping means should be so devised that they can be removed from the drum with their gripper jaws open. They can thus be withdrawn from the tire building drum without awaiting the step of removing the finished tire casing from the drum after withdrawing the tail stock and folding body, or interfering with that operational step.

In a preferred embodiment the gripper jaws are provided with a U-shaped or V-shaped cross-section so that the bead cores are safely held between them when in closed position.

The several objects and advantages referred to above will become more apparent upon reference to the accompanying drawings, in which:

Figure 1 is a longitudinal view of a machine for building tire casings which is fitted out with an apparatus, according to our invention;

Figure 2 is a transverse sectional view indicated by line 2—2 on Figure 1 and shows the apparatus for placing bead cores on the tire building drum in four different positions (a), (b), (c), and (d).

Figure 3 is a fragmentary view of the gripping means showing an embodiment of the locking and release device for the gripper jaws.

Referring to the drawings somewhat more in detail, and in particular to Figure 1, the tire building machine to which the apparatus according to the present invention is to be applied, comprises a segmented tire building drum 1 of expandable diameter having circumferential grooves 10 near its opposite ends, and being supported on a central shaft 4 which is mounted with its one end in a stanchion 22. This stanchion serves to hold the supporting bars 16 and 23 and the control organs necessary for operating the tire building machine. The machine further comprises the displaceable tail stock 24 and the folding bodies 12, 13 which are mounted coaxially displaceable in relation to the tire building drum 1. These folding bodies may possess the form of segmented auxiliary drums as provided in the above-mentioned Patent Number 2,743,760.

The apparatus for positioning the bead cores comprises in turn gripping means consisting of pairs of upper and lower jaws 25, 26. Normally two pairs of gripper jaws 25 and 26 are provided for the tire building machine. The gripper jaws 25, 26 have a U-shaped cross section and are capable of receiving between them the bead cores 19 which are to be brought onto the tire building drum 1. The gripper jaws 25, 26 are pivotally mounted on guide rails 31, 32 and are displaceable along said guide rails 31, 32 in parallel direction of the longitudinal axis of drum 1. The gripper 25 is rigidly attached to the lower guide rail 32, for instance by lock means such as a screw 33 and slides loosely on guide rail 31. The gripper means 26 are rigidly attached to the guide rail 31, for instance by locking means such as a screw 34, and slides loosely on the guide rail 32. Both guide rails are actuated back and forth between positions (e) and (f) as indicated by 25e, 26e, and 25f and 26f, with the aid of reciprocating means such as hydraulically or pneumatically operated cylinders 35, 36.

The guide rails 31, 32 are supported by bearing rods 27, 28 which may be moved upwardly and downwardly together with the guide means 26 in the direction of the arrows at 27. This movement of the bearing rods 27, 28 is achieved by cylinder means 29, 30, which are operated by pneumatic, hydraulic or mechanical power.

Referring now more specifically to Figure 2 the gripper jaws 25, 26 are shown in four different positions. In position (a) and (b) the bearing rods 27, 28 and the guiding rails 31, 32 have been moved upwardly in vertical direction to the drum axis so as to move the gripping means 25, 26 clear of the drum. In position (a) the upper and lower gripper jaws are open as indicated by 25a. In position (b) the gripper jaws are closed, as indicated by reference numerals 25b, and hold between them the bead core 19.

In positions (c) and (d) the bearing rods 27, 28 are in their lowermost position in the cylinders 29, 30 and the guide rails 31, 32 and together with them the grippers 25, 26 engage the tire building drum 1. In position (c) the gripper jaws are closed and still holding the bead core 19 while in position (d) the gripper jaws as indicated by the numerals 25d are open and have released the bead core 19.

In the embodiment of the gripping means 25 or 26 which is shown in the drawings, in particular in Figure 3, the gripper jaws 25 are held in closed position by means of a resilient member such as the spring 37. The jaws are opened for instance by pressure exercised by the tire building drum 1 when inflated, against the inner curved surface 38 of the gripper jaws. When the tire building drum has reached its largest diameter and simultaneously opened the gripper jaws wide enough to allow them to pass clear of the drum, the jaws are held in open position against the action of spring 37 by locking means such as the ratchets 39 and lock bolts 40. In the embodiment shown in Figure 3 these lock bolts can be withdrawn under the action of solenoids 41, thereby releasing the gripper jaws which are closed again under the action of spring 37.

The different movements of parts 12 and 24, 27 and 28, 31 and 32, as well as 40 and 41 required in harmony with the different operational steps of tire building are synchronized by a remote control device 42 which is shown in a schematic view only.

The operation of a tire building machine which is provided with the apparatus according to the invention takes place in the following manner.

While the person attending the tire building machine is occupied with wrapping the tire fabric onto the tire building drum, the bead cores 19 to be used with the next following tire casing, are inserted between the gripper jaws 25, 26 which are in open position as indicated by 25a in Figure 2. Thereupon the gripper jaws are closed to firmly seize the bead cores 19 as indicated by numerals 25b.

After the tire casing which was being built in the meantime on the tire building drum has been finished, the tail stock 24 together with the folding body 12 supported by the former are displaced to the end position indicated by 24' and 12' respectively. The finished tire casing can then be removed from the machine.

Thereafter the bead cores 19 are applied by first moving the bearing rods 27, 28 together with the guide rails 31, 32 and the gripper means 25, 26 downwardly in the direction of the arrow at 27, i. e. vertical to the drum axis, so that the closed gripper jaws 25 and the bead cores 19 held by them are brought into concentric position with the tire building drum as is indicated by 25c and 26c in Figures 1 and 2.

The tail stock 24 may then be returned to its operating position and additional layers may be mounted on the tire building drum 1. Thereafter the diameter of the drum 1 is increased so that the bead cores 19 are set rigidly on the underlying fabric in the grooves 10 on the drum 1.

Simultaneously the expanding drum surface presses against the curved inner surfaces of the closed gripper jaws at 38 (Figures 2 and 3) and opens the gripper jaws so that they occupy poistion 25d when the drum has been inflated to its largest diameter. The open gripper jaws 25, 26 as indicated by 25d in Figure 2 are then lifted away from the drum to the position indicated by 25a by moving them together with the guide rails 31, 32 and the bearing rods 27, 28 upwardly past and away from the tire building drum 1, by means of pressure applied in the cylinders 29, 30, until the gripping means reached a position indicated at 25e, 26e.

Of course, the gripper jaws 25 must be opened sufficiently by correspondingly devising the curved parts of their inner surfaces at 30 so as to pass the drum 1 and/or the folding bodies 12 unobstructedly during upward movement.

In order to secure a greater production speed the movements of the gripper jaws 25, 26 are synchronized automatically with the operation of tire building on the drum 1, as stated before. The only remaining manual operation is thus the placing of the bead cores 19 into the open gripper jaws 25a. This can be done by an auxiliary worker standing away from the machine while no manual operation concerning the application of the bead cores 19 is required of the attendant in charge of tire building.

The apparatus according to the invention can be used not only with a tire building machine according to the abovementioned Patent 2,743,760, but also with other tire building machines wherein the bead cores may be conveyed onto a tire building drum with variable diameter. However, the apparatus according to the invention is particularly suitable for use with tire building machines according to the above-mentioned patent, since it is particularly easy to build into such a machine and to coordinate with the steps of the manufacturing process of the latter.

It will be understood that this invention is susceptible to modification in order to adapt it to different usages and conditions, and, accordingly, it is desired to comprehend such modifications within this invention as may fall within the scope of the appended claims.

We claim:

1. In a tire building machine having a tire building drum of variable diameter, an apparatus for placing and positioning annular bead cores on said drum, said apparatus comprising gripper means having pairs of gripper jaws for receiving the bead cores therein, said gripper jaws opening and closing in a plane at right angles to the longitudinal axis of said drum, first displacing means for displacing said gripper means in the direction of said longitudinal axis of said drum, and second displacing means for displacing said gripper means in a vertical direction to the longitudinal axis of said drum, said pairs of gripper jaws remaining in said plane at right angle to said longitudinal axis while being displaced by said first as well as by said second displacing means.

2. In a tire building machine having a tire building drum of variable diameter, an apparatus for placing and positioning at least two annular bead cores on said drum, said apparatus comprising at least two gripping means for receiving the bead cores therein, each of said gripping means consisting of a pair of essentially semicircular pivotally swiveling gripper jaws displaceable in the direction of the longitudinal axis of said drum, means for displacing said two gripping means in the direction of the longitudinal axis of said drum, and means for displacing said two gripping means in a vertical direction to the longitudinal axis of said drum.

3. In a tire building machine having an inflatable tire building drum provided with grooves for positioning the tire bead cores, an apparatus for placing and positioning annular bead cores on said drum, said apparatus comprising two gripping means for receiving the bead cores therein, each of said gripping means consisting of pairs of essentially semicircular pivotally swiveling gripper jaws adapted to be opened by said drum when the latter is being inflated, said gripping means being displaceable in the direction of the longitudinal axis of said drum, means for displacing said two gripping means, with said jaws in closed position, simultaneously by different lengths of travel in the direction of the longitudinal axis of said drum, so as to pass both said gripping means over said drum from one and the same end thereof, and place them in registering position with said grooves on said drum, and returning said gripping means to adjacent positions spaced from said drum after said gripping means have been opened by the inflating of said drum, and means for displacing said two gripping means in a vertical direction to the longitudinal axis of said drum.

4. An apparatus according to claim 1 comprising guide means arranged parallel to the axis of said drum for slidingly supporting said gripper means thereon, and means for altering the distance of said guide means from the axis of said drum.

5. An apparatus according to claim 1 comprising resilient means for holding said gripper jaws in closed position so as to resiliently seize the bead cores therebetween, and releasable locking means for locking said gripper jaws in open position against the action of said resilient means.

6. An apparatus according to claim 1 comprising gripper jaws having a U-shaped cross-section for seizing the bead cores therebetween.

7. An apparatus according to claim 1 comprising gripper jaws having a V-shaped cross-section for seizing the bead cores therebetween.

8. In a tire building machine having an inflatable tire building drum provided with grooves for positioning the tire bead cores, an apparatus for placing and positioning bead cores on said drum, said apparatus comprising two gripping means for receiving the bead cores therein, said gripping means consisting of pairs of essentially semi-circular, pivotally swivelling gripper jaws, said gripping means being adapted to be open by the inflating of said drum and displaceable in the direction of the longitudinal axis of said drum, means for displacing said two gripping means simultaneously when in closed position by different lengths of travel in the direction of the longitudinal axis of said drum, thereby placing them in registering position with said grooves on said drum, and thereafter returning them to adjacent positions spaced from said drum after said gripping means have been opened by the inflating of said drum, and means for displacing said two gripping means in a vertical direction to the longitudinal axis of said drum.

9. In a tire building machine having an inflatable tire building drum provided with grooves for positioning the tire bead cores, and apparatus for placing and positioning bead cores on said drum, said apparatus comprising two gripping means for receiving the bead cores therein, said gripping means consisting of pairs of essentially semi-circular, pivotally swivelling gripper jaws, said gripping means being adapted to be opened by the inflating of said drum and displaceable in the direction of the longitudinal axis of said drum, means for displacing said two gripping means simultaneously when in closed position by different lengths of travel in the direction of the longitudinal axis of said drum, thereby placing them in registering position with said grooves on said drum, and thereafter returning them to adjacent positions spaced from said drum after said gripping means have been opened by the inflating of said drum, means for displacing said two gripping means in a vertical direction to the longitudinal axis of said drum, resilient means for holding said gripper jaws in closed position so as to resiliently seize the bead cores therebetween, and releasable locking means for locking said gripper jaws in open position against the action of said resilient means.

10. In a tire builidng machine having an inflatable tire building drum provided with a pair of grooves near its opposite ends for positioning the tire bead cores, an apparatus for placing and positioning one bead core in each of said grooves on said drum, said apparatus comprising two gripping means each consisting of a pair of essentially semi-circular pivotally swivelling gripper jaws, releasable locking means for locking said gripper jaws in open position when being removed from said drum and in spaced position therefrom, resilient means for holding said gripper jaws in closed position after the bead cores have been placed between said jaws and said locking means have been released, means for displacing said two gripping means at a right angle to the longitudinal axis of said drum to a position parallel to each other and coaxial with said drum facing one end thereof and for returning them to a position out of alignment with said drum, means for displacing said two gripping means simultaneously by different length of travel so as to pass each one over said drum to a registering position with the respective groove on said drum and for returning said gripping means to their poistion in front of said drum, and a curved surface on each of said gripper jaws for opening said gripping means when engaged by said drum during the inflation of the latter, said gripping means thereby releasing said bead cores to remain in said grooves on said drum.

11. In a tire building machine having a tire building drum of variable diameter, an apparatus for placing and positioning at least two annular bead cores on said drum, said apparatus comprising at least two gripping means for receiving the bead cores therein, each of said gripping means consisting of a pair of essentially semicircular pivotally swivelling gripper jaws adapted for opening and closing in a plane at right angle to the longitudinal axis of said drum, and displaceable in the direction of the longitudinal axis of said drum, first means for displacing said two gripping means in the direction of the longitudinal axis of said drum and moving both said gripping means over said drum from one and the same end thereof, and second means for displacing said two gripping means in a vertical direction to the longitudinal axis of said drum.

12. In a tire building machine having an inflatable tire building drum, in combination one folding body at each end of said drum, one of said folding bodies being adapted to be spacedly displaced from said drum in the direction of the longitudinal axis of said drum so as to make the end of said drum facing said spacedly displaceable body accessible, and an apparatus for placing and positioning annular bead cores on said drum, said apparatus comprising two gripping means for receiving said bead cores therein, each of said gripper means comprising a pair of gripper jaws adapted for opening and closing in a plane perpendicular to said longitudinal drum axis, first means for moving both said gripper means in closed position perpendicular to said plane into coaxial position with said drum between said drum and said spaceable body with the latter spaced from said drum, and withdrawing said gripping means from said drum in said perpendicular plane when said gripping means are in open position, and second means for displacing said gripping means in the direction of said longitudinal drum axis, so as to pass over said drum from said end facing said spaceable body.

13. A method for placing and positioning bead cores in the process of building tires on a tire building machine having an inflatable drum provided with annular means for positioning the tire bead cores, comprising the steps of laying at least two annular bead cores each inside a pair of semicircular pivotally swiveling gripper jaws, closing said pairs of gripper jaws, moving both said pairs of gripper jaws with said bead cores in parallel position in a plane vertical to the longitudinal axis of said drum to a position coaxially with said drum, displacing said gripper jaws in the direction of said longitudinal drum axis simultaneously and by different lengths of travel, thereby passing them over said drum and placing them in registering position with said annular means thereon, inflating said drum, opening said gripper jaws, withdrawing said pairs of opened gripper jaws from said bead cores on said drum in said vertical plane, and returning them to their starting position by displacing them parallel to said longitudinal drum axis.

14. A method for placing and positioning bead cores in the process of building tires on a tire building machine having an inflatable drum provided with annular means for positioning the tire bead cores, and two folding bodies with one body at each end of said drum, comprising the steps of laying at least two annular bead cores each inside a pair of semicircular pivotally swiveling gripper jaws, closing said pairs of gripper jaws, displacing one of said folding bodies spacedly from said drum, moving both said pairs of gripper jaws with said bead cores in parallel position in a plane vertical to the longitudinal axis of said drum to a position coaxially with said drum between the latter and said folding body spaced therefrom, displacing said gripper jaws in the direction of said longitudinal drum axis simultaneously and by different lengths of travel, thereby passing them over said drum and placing them in registering position with said annular means thereon, inflating said drum, opening said gripper jaws, withdrawing said pairs of opened gripper jaws from said bead cores on said drum in said vertical plane, and returning them to their starting position by displacing them parallel to said longitudinal drum axis.

References Cited in the file of this patent

UNITED STATES PATENTS

| 2,567,150 | Frazier et al. | Sept. 4, 1951 |
| 2,679,885 | Sapp et al. | June 1, 1954 |
| 2,679,886 | Sapp et al. | June 1, 1954 |